United States Patent Office 3,766,277
Patented Oct. 16, 1973

3,766,277
RECOVERY OF PENTAERYTHRITOL USING TERT-BUTYL ALCOHOL
Clarence J. Duey, Bay City, Roy H. Prinz, Robstown, and James M. Ramey, Spring, Tex., assignors to Celanese Corporation, New York, N.Y.
No Drawing. Filed Mar. 29, 1971, Ser. No. 129,215
Int. Cl. C07c 31/24
U.S. Cl. 260—637 P    11 Claims

ABSTRACT OF THE DISCLOSURE

Aqueous solutions containing pentaerythritol and an alkali or alkaline earth metal alkanoate, such as the pentaerythritol-sodium formate solutions produced in the course of manufacturing pentaerythritol from acetaldehyde, formaldehyde, and sodium hydroxide, are treated to recover pentaerythritol therefrom by extracting with tert-butyl alcohol, which may contain up to 30% water, to form an extract phase containing pentaerythritol. The pentaerythritol is recovered from the extract by crystallization. The crystallization step can be improved by treating the extract, prior to the crystallization step, with charcoal or a macroreticular resin.

BACKGROUND OF THE INVENTION

Processes are well-known for the production of pentaerythritol by reacting formaldehyde with a higher aldehyde, such as acetaldehyde, in the presence of an alkaline condensing agent, typically an alkali or alkaline earth metal hydroxide. Illustrative of the most widely used type of process for producing pentaerythritol is U.S. Pat. 2,790,836 to Mitchell and Pritchett, which patent discloses production of pentaerythritol from acetaldehyde and formaldehyde using a sodium hydroxide catalyst. Other catalysts such as barium hydroxide, potassium hydroxide, sodium carbonate and magnesium oxide have also been suggested for use in such reactions. Likewise, the acetaldehyde may be substituted with such compounds as beta-hydroxypropionaldehyde, acrolein, acetaldol and paraldehyde in the production of pentaerythritol.

In most of the foregoing type of processes as well as in many others, there results a large waste stream which is an aqueous solution containing dissolved therein both pentaerythritol as well as a metal salt of a carboxylic acid, the latter resulting from a reaction between the alkaline condensing agent and acid formed from the aldehyde present. Most often the metal salt is a formate. These large waste streams are usually sewered even though there are large amounts of valuable pentaerythritol therein because no efficient methods have been developed for recovery of the pentaerythritol which avoid contamination of the product with an excessive amount of the metal salt.

SUMMARY OF THE INVENTION

It is thus an object of the present invention to provide a process for recovering pentaerythritol from aqueous solutions containing both pentaerythritol and metal salts therein. It is a particular object of the present invention to provide a process for recovering pentaerythritol from an aqueous stream derived from a process for the production of pentaerythritol by reaction between formaldehyde and acetaldehyde in the presence of an alkaline condensing agent, which aqueous stream also contains a metal salt dissolved therein. Additional objects will become apparent from the following description of the present invention.

These and other objects are accomplished by the present invention which in one of its aspects is a process for treating an aqueous solution containing dissolved therein both pentaerythritol and an alkali or alkaline earth metal salt of a carboxylic acid so as to recover said pentaerythritol, which process comprises intimately contacting said aqueous solution with a solvent consisting essentially of 70% to 100% by weight of tert-butyl alcohol and 0% to 30% by weight of water, allowing a tert-butyl alcohol phase and an aqueous phase to form, separating the resulting said tert-butyl alcohol phase from the said aqueous phase, and recovering the pentaerythritol contained in said tert-butyl alcohol phase.

DETAILED DESCRIPTION OF THE INVENTION

The streams to be treated in accordance with the present invention are those aqueous solutions containing both a metal salt and pentaerythritol dissolved therein. The invention finds its most use in treating streams originating from those processes wherein the pentaerythritol was produced with formaldehyde and acetaldehyde as reactant and a metal hydroxide as a catalyst. The process may be utilized to recover pentaerythritol from an aqueous solution practically regardless of the concentration of the solution or the ratio of the metal salt to pentaerythritol therein, however the solution should contain at least 45% by weight of water. Generally speaking, however, the more favorable results will be obtained when the aqueous solution contains by weight from about 55% to 80% water, 3% to 15% pentaerythritol and 15% to 35% metal salt, the total percentage of course being 100%. Most advantageously the present invention is applied to aqueous solutions containing by weight from about 65% to 80% water, 4% to 9% pentaerythrtiol and 20% to 30% metal salt. In addition to the water, pentaerythritol and metal salt present there may also be present other compounds in small amounts, preferably less than two percent by weight, without affecting the process. In fact, there will almost always be small amounts of these other compounds such as dipentaerythritol, formals, formose sugars, and aldol resins present in those streams to which the invention is most applicable, that is, those derived from a process wherein the pentaerythritol is produced and recovered by crystallization. Thus, the aqueous solution from which the pentaerythritol is recovered in accordance with the present invention could be the mother liquor from one or more of such crystallizations or be derived from such mother liquors.

The metal salt which will be present in the streams being treated will in general be an alkali or alkaline earth metal salt of a carboxylic acid, most often the salt being of formic acid such that the salt is a formate. More specifically, the salt will usually be of an alkanoic acid of 1 to 6 carbon atoms. The metal portion of the salt will as stated by an alkali metal such as sodium, potassium or lithium or an alkaline earth metal such as calcium, barium, strontium or magnesium. However, the invention is especially suitable to recover sodium salts.

The first step in recovering the pentaerythritol from solution is a solvent extraction step wherein a selective solvent comprising tert-butyl alcohol is intimately contacted with the aqueous solution of pentaerylthritol and metal salt so as to extract pentaerythritol therefrom. The tert-butyl alcohol used as the selective solvent does not have to be pure as mixtures thereof with water will perform efficiently. However, when water is presnet in the selective solvent it is preferably present in amounts of less than 30 percent by weight based on the total weight of alcohol and water. Thus, the selective solvent could generally be described as consisting essentially of 0% to 30%, preferably 0% to 15%, by weight water and 70% to 100%, preferably 85% to 100%, by weight of tert-butyl alcohol. The use of the tert-butyl alcohol-water azeotrope containing about 11.7 weight percent water and 88.3 weight percent tert-butyl alcohol is especially beneficial when solvent recovery is a consideration as hereinafter explained. In using the tert-butyl alcohol solvent in extracting the pentaerythritol, the volume used will depend on whether or not the solvent contains any water as well as on the concentration of the aqueous solution being treated and the ratio of pentaerythritol to metal salt therein. However, in general at least 0.8 volumes, for example, 0.8 to 10 volumes, of the solvent will be utilized per volume of the aqueous solution of pentaerythritol and metal salt. Optimum results will be obtained when there are used from about 1.5 to 4.0 volumes of tert-butyl alcohol solvent per volume of aqueous solution being treated.

In accomplishing extraction the main requirement is that the aqueous solution of pentaerythritol and metal salt and the selective solvent be brought together in an extraction zone and intimately contacted there so as to permit the pentaerythritol to transfer into the tert-buyl alcohol and form an extract phase, which in the present application will be termed the tert-butyl alcohol phase. The metal salt present in the aqueous solution is relatively unaffected by the tert-butyl alcohol and remains mainly in the aqueous soltuion to become the raffinate phase, or as hereinafter descriptively termed the aqueous phase. Most of the water, if any, originally present in the selective solvent will generally also remain with the aqueous phase instead of the tert-butyl alcohol phase although the alcohol phase may contain small percentages of water.

The extraction equipment used may be operated batchwise or continuously with a continuous process being preferred. Representative types of equipment that may be utilized in both batch operations and continuous operations include mixer-settlers, vertical towers of various kinds which operate by gravity flow, agitated tower extractors and centrifugal extractors. When using a tower extractor operated by gravity flow, such as a vertical tower having packing, baffles or plates therein, the aqueous solution of pentaerythritol and metal salt will typically be introduced into an upper point of the tower while the selective solvent is introduced at a lower point in the tower. The solvent, at least the tert-butyl alcohol portion thereof, being lighter passes up through the tower while being intimately contacted with the descending aqueous solution. The tert-butyl alcohol having preferentially dissolved the pentaerythritol leaves the top of the tower as the extract phase while the raffinate phase comprised mainly of an aqueous solution of metal salt is withdrawn from the bottom of the tower.

The solvent extraction may be accomplished over a wide range of temperatures and pressures although it is preferably accomplished within the range of 28° C. to 100° C., especially 35° C. to 70° C. The main requirement as to temperature is that it is only necessary to maintain a temperature that will prevent the tert-butyl alcohol from solidifying, such having a normal melting point of 25.5° C. The pressure during the extraction needs only to be sufficient to prevent boiling and maintain a liquid phase and may be subatmospheric, atmospheric or superatmospheric. Specific pressures at which the extraction may be accomplished include from 0.5 to 10 atmospheres absolute with the preferred operating range being from atmospheric to 3 atmospheres absolute.

After formation and separation of the tert-butyl alcohol phase and aqueous phase as described above, the next step of the process is the recovery of the pentaerythritol from the tert-butyl alcohol phase. The metal salt may be recovered from the aqueous phase if desired such as by "salting out" but its recovery does not constitute a part of the present invention. Recovery of the pentaerythritol may be accomplished by any of the known methods such as by merely evaporating the tert-butyl alcohol phase to dryness in order to obtain solid pentaerythritol. Although evaporation is effective to recover the pentaerythritol from the tert-butyl alcohol phase of the extraction, it is not the preferred method because the difficulty of recovering the solvent for recycle to the extraction zone. The preferred method of recovering the pentaerythritol and also the solvent is to first add to the tert-butyl alcohol phase from the extractor at least 0.2 volumes of water and then distill the resultign mixture so as to remove the tert-butyl alcohol therefrom. In such cases the tert-butyl alcohol is preferably removed as the distillate in the form of the tert-butyl alcohol-water azeotrope having a composition of about 88.3% by weight tert-butyl alcohol and 11.7% by weight water, and having a normal boiling point of 79.9° C. The alcohol having been removed in the distillate, the bottoms fraction from the distillation comprises mainly an aqueous solution of pentaerythritol from which pentaerythritol may be recovered by standard techniques such as crystallization.

The reason for adding the water to the tert-butyl alcohol phase removed from the extraction zone is, of course, to allow the removal of the tert-butyl alcohol as the azeotrope in the distillation such that the azeotrope can be recycled to the extraction zone as the selective solvent. Although at least 0.2 volumes of water should be added to the tert-butyl alcohol phase, for example 0.2 to 2.0 volumes, it is preferred that from 0.4 to 1.5 volumes of water be added per volume of the tert-butyl alcohol phase. In accomplishing the distillation any of the conventional techniques and equipment may be used and the particular method utilized to accomplish such does not constitute a part of the invention. All that is required is that the azeotrope be removed as overheads and a bottom fraction comprising mainly an aqueous solution of pentaerythritol be romeved as the bottom fraction. Penterythritol is then recovered from this bottoms fraction preferably by crystallization. Any of the known crystallization techniques may be used to effect crystallization and such crystallization may be effected by cooling without evapoartion such as in a cooling crystallizer, or by evaporation without cooling as in a crystallizing evaporator, or accomplished using a combination of both evaporation and cooling such as through use of a vacuum crystalizer. Preferably the crystallization step is accomplished with both cooling and evaporation or removal is at least a portion of the water, for example, from 20% to 80% of the water. Upon crystallization of the pentaerythritol it may be easily recovered by filtration, centrifugation and the like.

The typical process for production of pentaerythritol generally has one or more crystallizers wherein the product is recovered and such crystallizers will generally be adequate for recovery of the pentaerythritol from the bottoms fraction mentioned above. In other words the bottoms fraction from the distillation can be recycled to the main process crystallizers instead of installing special crystallizers for the bottoms fraction stream.

Before accomplishing the crystallization of the pentaerythritol from the bottoms fraction aqueous solution as described above, it will generally be desirable and usually necessary to first treat the bottoms fraction so as to remove impurities which retard or inhibit crystallization. The crystallization inhibiting impurities generally arise in the production of the pentaerythritol and are carried through the present process with the pentaerythritol so as to end up in the bottoms fraction. Although all of the impurities of this type have not been identified some of them are known. The pentaerythritol-dimers and trimers, as well as the formals, tend to cause some difficulty themselves during crystallization of the pentaerythritol, but the formose sugars in particular have been found not only to inhibit pentaerythritol crystal growth but also, as a result of their tendency to caramelize during evaporation of the aqueous pentaerythritol solution, their presence results in discoloration of the final pentaerythritol product. Various methods are known and will be apparent to those skilled in the art for removal of the crystallization inhibiting impurities. Conveniently, for example, the bottoms fraction aqueous solution can be treated with charcoal to accomplish their removal, such as treatment also serving to remove many other types of color bodies which might cause unwanted discoloration of the final product. Powdered charcoal, for example from 0.5% to 3.0% by weight, could be added to the aqueous solution, dispersed throughout and then removed by filtration and/or by allowing the charcoal to settle. In the alternative, the bottoms fraction could be passed through a bed of charcoal.

Another method of removing crystallization inhibiting impurities, including especially formose sugars, is to pass the aqueous solution of pentaerythritol through a bed of beads of macroreticular resin. Suitable macroreticular resins are typically organic, water-insoluble, non-ionic, hydrated (preferably substantially completely hydrated) porous polymers in bead form which are further characterized by having an unique macroreticular physical porosity, high surface area, and uniform (i.e. substantially uniform) pore-size distribution. They have good thermal stability and can be employed at temperatures of 150° C. and higher. Typical of such macroreticular resins are those comprising or consisting essentially of a cross-linked hydrocarbon polymer, for example a co-polymer of a monoethylenically unsaturated aromatic hydrocarbon (e.g. vinyl, allyl, methallyl, etc.-substituted benzene, toluene, dimethyl benzene, ethyl benzene, etc.), cross-linked with a divinyl compound, more particularly a divinyl aromatic compound, and specifically divinyl benzene. The divinyl compound may constitute, for example, from about 3 to about 16 mole percent of the copolymer.

The porous polymers used in practicing the present invention also may be described as synthetic gels consisting essentially of cross-linked hydrophilic chains. They are devoid of ionic groups and are polar in character, which is due almost entirely to their high content of hydroxyl groups.

Commercially-available resins of the above-described type which are applicable in the present process include "Amberlite XAD-1 and XAD-2" (trade names of Rohm and Haas Company, Philadelphia, Pa.), which are understood to be copolymers of styrene and divinyl benzene wherein the divinyl benzene functions as a cross-linking agent. It is estimated that the mole percent of the cross-linking agent is between about 6% and 12%.

When the bed has been exhausted, i.e. when the bed has turned dark or when formoses begin to appear in the effluent in appreciable quantity, it can be regenerated to its initial activity level by elution with methanol, advantageously in an amount of at least about two bed volumes of methanol per volume of resin bed. The flow rate of methanol through the bed during the elution step is advantageously essentially the same as the liquid flow are discussed previously for the absorption cycle. Following the methanol elution, water backwashing is recommended to remove the methanol, although methanol removal is not essential, and also to hydraulically reclassify the resin to minimize channeling in the subsequent elution step.

In treating the bottoms fraction aqueous solution so as to remove the impurities it is only necessary to maintain the temperature high enough to prevent precipitation of solids from solution. Temperatures in excess of 100° C. are not necessary with a generally suitable temperature being within the range of 35° C. to 70° C. In addition to the treatment to remove the crystallization inhibiting impurities treatments to remove other types of impurities may also be performed before effecting crystallization. For example, ozonation might be used to remove color bodies, acid treatment to remove formals and the like.

The following examples are given to illustrate the present invention but are not to be taken as limiting the scope thereof. In the examples all parts and percentages are by weight unless otherwise indicated.

Example I

An aqueous solution is prepared from pure reagents so as to contain about 8% pentaerythritol and 27% sodium formate. To 100 ml. of this solution is added 100 ml. of tert-butyl alcohol at 55° C. with stirring. A lower aqueous layer or phase and an upper alcohol layer is allowed to form and then the alcohol phase removed and evaporated to dryness in order to obtain about 3 grams of solid material. Analysis of the solid indicates it to be composed of about 0.3 grams of sodium formate and 2.7 grams of pentaerythritol, or 34% of the pentaerythritol contained in the original aqueous solution.

Example II

In a continuous process an aqueous solution derived from the production of pentaerythritol by reacting acetaldehyde with formaldehyde in a aqueous medium in the presence of a sodium hydroxide catalyst is passed to a four-tage counter-current extractor operating at 30° C. The aqueous solution contains about 8% pentaerythritol, 27% sodium formate, 1% polypentaerythritols, 1% formals and 0.5% formose sugars. Also fed to the extractor is the tert-butyl alcohol-water azeotrope containing 88.3% tert-butyl alcohol and 11.7% water, the volume ratio of azeotrope to aqueous solution fed being about 2.5:1. Following the extractor the alcohol phase removed therefrom is combined with about 0.75 volumes of water per volume of alcohol phase and passed to a distillation tower 6-feet in height, 1-inch in diameter and packed with 3/32-inch Podbelniak Helipaks. The distillation tower is operated at a reflux ratio of 2:1 and atmospheric pressure, the tert-butyl alcohol-water azeotrope being removed overhead at a temperature of about 80° C. and a bottoms fraction comprising mainly an aqueous solution of pentaerythritol and residual impurities being removed at a temperature of 100° C. The azeotropic distillate is recycled to the extractor and the bottoms fraction, without any substantial cooling, is then treated in batches with 1% powdered charcoal to remove impurities which retard crystallization and contribute to color. After the charcoal treatment the aqueous solution is concentrated by evaporation so as to contain about 35% pentaerythritol and then cooled to 25° C. to crystallize the pentaerythritol present. The crystals are recovered by filtration, dried and analyzed. Analysis shows them to contain about 94% pentaerythritol, 3% polypentaerythritols, 5.6% formals and only 0.14% sodium formate.

The embodiments of the invention in which an exclusive property or privilege is claimed are defined as follows:

1. A process for treating an aqueous solution containing dissolved therein about 3% to 15% by weight of pentaerythritol and about 15% to 35% by weight of an alkali or alkaline earth metal salt of a one to six carbon atom alkanoic acid so as to recover said pentaerythritol, said aqueous solution containing at least 45% by weight of water, which process comprises extracting said aqueous solution with a solvent consisting of essentially 70% to 100% by weight of tert-butyl alcohol and 0% to 30% by weight of water, employing 0.8 to 10 volumes of solvent per volume of said aqueous solution, to form a tert-butyl alcohol extract phase and an aqueous raffinate phase; separating the resulting tert-butyl alcohol extract phase from the aqueous raffinate phase; and recovering pentaerythritol from said tert-butyl alcohol extract phase by crystallization.

2. The process of claim 1 wherein said solvent is the tert-butyl alcohol-water azeotrope having a composition of about 88.3% by weight tert-butyl alcohol and 11.7% by weight water.

3. The process of claim 1 wherein said salt is sodium formate; said aqueous solution contains by weight from about 3% to 15% pentaerythritol, from about 15% to 35% sodium formate and 55% to 80% water; and the pentaerythritol contained in said solution has been produced by the reaction of formaldehyde and acetaldehyde in the presence of a sodium hydroxide catalyst.

4. The process of claim 3 wherein said extraction comprises contacting each volume of said aqueous solution with from 1.5 to 4.0 volumes of said solvent.

5. The process of claim 4 wherein the pentaerythritol is recovered from said tert-butyl alcohol phase by first adding at least 0.2 volume of water thereto for each volume of said alcohol phase followed by the successive steps of passing the resulting tert-butyl alcohol phase-water mixture to a distillation zone wherein the said tert-butyl alcohol water azeotrope is removed as the distillate while an aqueous solution of pentaerythritol is removed as the bottoms fraction and then recovering pentaerythritol from the said bottoms fraction by crystallization.

6. The process of claim 5 comprising the additional step of removing crystallization-inhibiting impurities from said bottoms fraction prior to said crystallization step by contacting with a member of the group consisting of charcoal and macroreticular resins.

7. The process of claim 5 wherein said crystallization-charcoal.

8. A continuous process for the recovery of pentaerythritol from an aqueous solution containing dissolved therein from about 3% to 15% by weight pentaerythritol and from 15% to 35% by weight sodium formate and 55% to 80% by weight water, which process comprises extracting said aqueous solution with the tert-butyl alcohol-water azeotrope having a composition of about 88.3% by weight tert-butyl alcohol and 11.7% by weight water to form a tert-butanol-water extract phase and an aqueous raffinate phase, withdrawing said tert-butyl alcohol extract phase from said extraction zone and mixing same with from about 0.2 to 2.0 volumes of water per volume of said extract phase conducting the resulting mixture of said tert-butyl alcohol extract phase and water to a distillation zone wherein said tert-butyl alcohol-water azeotrope is recovered as the distillate and an aqueous solution of pentaerythritol is recovered as the bottoms fraction, recycling said distillate to said extraction zone, contacting said bottoms-fraction with a member of the group consisting of charcoal and macroreticular resins so as to remove crystallization-inhibiting formose sugars therefrom and recovering the pentaerythritol from said treated bottoms fraction by crystallization.

9. The process of claim 8 wherein said aqueous solution extracted with the tert-butyl alcohol-water azeotrope is derived from a process wherein pentaerythritol is produced by the reaction of formaldehyde and acetaldehyde in the presence of a sodium hydroxide catalyst and then the pentaerythritol so produced recovered by crystallization.

10. The process of claim 9 wherein said crystallization inhibiting formose sugars are removed by contacting with charcoal.

11. The process of claim 9 wherein said crystallization-inhibiting formose sugars are removed by contacting with a macroreticular resin.

References Cited

UNITED STATES PATENTS

| | | | |
|---|---|---|---|
| 2,533,737 | 12/1950 | Mertz | 260—637 P |
| 2,790,837 | 4/1957 | Robeson | 260—637 P |
| 2,806,889 | 9/1957 | Gottesman et al. | 260—637 P |
| 3,082,259 | 3/1963 | Bauer et al. | 260—637 P |
| 2,299,048 | 10/1942 | Wyler et al. | 260—637 P |
| 3,012,078 | 12/1961 | Peterson et al. | 260—633 P |

FOREIGN PATENTS

| | | | |
|---|---|---|---|
| 816,208 | 7/1959 | Great Britain | 260—637 P |
| 866,365 | 4/1961 | Great Britain | 260—637 P |

BERNARD HELFIN, Primary Examiner

J. E. EVANS, Assistant Examiner

U.S. Cl. X.R.

260—540, 541, 542

PO-1050
(5/69)

UNITED STATES PATENT OFFICE
CERTIFICATE OF CORRECTION

Patent No. 3,766,277   Dated October 16, 1973

Inventor(s) Clarence J. Duey, Bay City, Roy H. Pring, Robstown, and James M. Ramey, Spring, Texas.

It is certified that error appears in the above-identified patent and that said Letters Patent are hereby corrected as shown below:

In claim 7, after "crystallization-", insert -- inhibiting impurities are removed by contacting with--.

Signed and sealed this 12th day of March 1974.

(SEAL)
Attest:

EDWARD M. FLETCHER, JR.
Attesting Officer

C. MARSHALL DANN
Commissioner of Patents